US008949404B2

(12) United States Patent
Luciani, Jr. et al.

(10) Patent No.: US 8,949,404 B2
(45) Date of Patent: Feb. 3, 2015

(54) ACQUIRING GRAPHICAL OPERATING SYSTEM POST-FAILURE SCREEN

(75) Inventors: Luis E. Luciani, Jr., Tomball, TX (US); Don A. Dykes, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1586 days.

(21) Appl. No.: 11/135,761

(22) Filed: May 24, 2005

(65) Prior Publication Data

US 2006/0271881 A1 Nov. 30, 2006

(51) Int. Cl.
*G06F 15/173* (2006.01)
*G06F 11/14* (2006.01)

(52) U.S. Cl.
CPC ........ *G06F 11/1441* (2013.01); *G06F 11/1417* (2013.01)
USPC ............................ 709/224; 709/225; 709/226

(58) Field of Classification Search
CPC .......... H04L 43/04; H04L 43/08; H04L 43/10
USPC .......................................... 709/224; 713/1–2
See application file for complete search history.

(56) References Cited

U.S. PATENT DOCUMENTS 5,732,212 A * 3/1998 Perholtz et al. ............... 709/224
5,852,720 A 12/1998 Gready et al.
5,864,653 A * 1/1999 Tavallaei et al. .................. 714/2
6,070,253 A * 5/2000 Tavallaei et al. ................ 714/31
6,173,340 B1 1/2001 Gready et al.
6,233,634 B1 5/2001 Clark et al.
6,560,726 B1 * 5/2003 Vrhel et al. ...................... 714/55
2002/0108074 A1 8/2002 Shimooka et al.
2003/0110244 A1 * 6/2003 Mondal ......................... 709/223
2003/0217123 A1 * 11/2003 Anderson et al. ............. 709/219
2004/0243795 A1 * 12/2004 Hsu et al. ......................... 713/2

FOREIGN PATENT DOCUMENTS

KR 2005068334 * 7/2005

* cited by examiner

*Primary Examiner* — Umar Cheema (57) ABSTRACT

Systems, methodologies, and media associated with acquiring a graphics mode post-failure screen provided by a graphical operating system running on a self-reset capable computer are described. One exemplary method embodiment may be performable in a management processor (e.g., ASIC, FPGA) that is configured to be operably connected to a computer (e.g., server) that is configured to provide a graphical post-failure screen and to self-reset upon entering a failure state. The exemplary method embodiment may include receiving a stream of video data from the computer and making it available to a downstream component like a remote console application. The exemplary method may also include performing a screen refresh after detecting the failure state in the computer. The exemplary method may also include selectively storing the graphical post-failure screen in a memory associated with the management processor.

13 Claims, 5 Drawing Sheets

ACQUIRING GRAPHICAL OPERATING SYSTEM POST-FAILURE SCREEN

BACKGROUND

Operating systems may fail (e.g., "crash"). When they crash, some operating systems may attempt to provide a text mode screen with information about the state of the computer and/or the operating system at the time of the crash. This text mode information may be useful in diagnosing the cause(s) of the crash. Unfortunately, the text mode screen may only display briefly until the operating system is automatically rebooted. For example, a watchdog timer may automatically reboot a system upon detecting a failure. Thus, techniques for capturing the text mode information before an automatic reboot occurred were developed. One technique includes continuously recording a character stream output by the operating system until a system reset is detected. Upon detecting the reset, recording is halted and a certain amount of the recorded character stream is stored to a known location, hopefully before the watchdog timer can reboot the system and cause the data to be lost. This technique requires continual textual recording, requires detecting a system reset and responding substantially instantaneously, requires dedicated resources (e.g., memory) and only works when the failure screen is provided in text mode. Furthermore, since the operating system may no longer have access to a file system and/or bulk storage devices like a disk drive, the failure data must be stored in memory that will retain its integrity after a system reboot.

Some operating systems (e.g., Windows 2003) may not provide text based crash-related information. Rather, these operating systems may be in a graphics mode at all times, including during crash processing. While continually recording a text stream may require a first acceptable level of system resources (e.g., memory) and may impose a first acceptable level of complexity and overhead on an operating system, continually recording a graphics stream may require a second unacceptable level of resources (e.g., memory) and may impose a second unacceptable level of complexity and overhead. For example, while storing an entire page of text mode data may require only 1 Kb of memory arranged in a circular queue where older characters can be replaced with newer characters, storing entire pages of graphics mode data may require substantially more memory, and may require more complicated data structures and processing. For example, up to 2.3 Megabits may be required to store an uncompressed 640×480 image.

Still other operating systems and/or utilities may attempt to provide a view of the computer screen as it looked at the moment the operating system crashed. These utilities are commonly referred to as screen capture programs. While these types of programs may provide a view of the screen when the system crashed, they may not provide crash-related information like that provided in the earlier text-based systems. Furthermore, while these programs may provide information about what was on the screen, they may not guarantee capturing a post-failure screen if one is available. Additionally, these types of applications may need to be installed on a server rather than residing in an off-server management processor. Therefore, the video capture may come from the additional installed software and create additional overhead on the server.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems and methods described herein relate to acquiring a graphical operating system post-failure screen. In one example, a method may be performed on a management processor that is operably connected to a computer (e.g., server) that can reset itself. The management processor may include hardware that has access to a digital video output from the computer. The computer may be configured to provide a graphical post-failure screen as part of its self-reset processing. This graphical post-failure screen may be available for a limited time.

Thus the management processor may be configured to receive a video stream from the computer and upon detecting a self-reset condition in the computer, to control the computer to perform a screen refresh at a time when the graphical post-failure screen will be displayed. The post-failure screen will then be in the video stream that is available to the management processor hardware performing the method. The method may then include acquiring the post-failure screen from the video stream and selectively storing the captured video stream thereby storing the post-failure screen.

By way of illustration, an operating system on a mission critical computer like a server may be configured to present a failure screen when the operating system suffers an unrecoverable error. The failure screen may provide information like register contents, process data, and so on that is useful for determining the cause of the failure. Furthermore, mission critical computers like servers may be configured with a watchdog timer tasked with rebooting the server upon detecting a failure so that the server does not remain indefinitely unavailable. Like conventional systems, the reboot may wipe out the failure screen. Thus, example methods facilitate acquiring the graphical failure screen after the failure is detected but before the reboot. It is to be appreciated that these methods may be performed by hardware that is at least partially independent from the failed system.

In one example, a management processor may be associated with a server by being directly and/or indirectly connected to the server. The management processor may be configured so that it does not crash when the server crashes. Example management processors may be implemented on an ASIC (application specific integrated circuit), an FPGA (field programmable gate array), a plug-in circuit board, and so on. One example of a management processor is Hewlett Packard's iLO2 (integrated lights out) system.

A management processor may receive a video stream from an operating system running on a server. Providing this video stream imposes no additional overhead on the server. In normal processing, the management processor may receive the video stream, compress it, and send it across a connection to a remote console. Under certain circumstances, the management processor may selectively store data available in the video stream.

The management processor may also detect that the server is about to reset itself after, for example, an operating system crash. By way of illustration, an iLO2 ASIC may be configured to detect that a server reboot is about to occur based on monitoring an automatic server reset (ASR) signal. In one example, prior to the reboot, an interrupt may be generated that can be detected by the management processor. The management processor may service the interrupt, giving the management processor an opportunity to capture the graphical failure screen. For example, while servicing the interrupt the management processor may cause a screen refresh to be performed. As described above, the management processor may have the video output from the failing system available. Thus, the management processor may capture the screen generated in response to the screen refresh. This screen will be the post-failure screen. Since the management processor may capture the post-failure screen from an already compressed remote console video stream, a smaller amount of memory may be required to store the post-failure screen than is required by typical screen capture applications. While obtaining a compressed version of the post-failure screen is described, it is to be appreciated that in some examples an uncompressed version may be obtained.

The management processor may store the already compressed post-failure screen in its own memory (e.g., RAM) and thus the post-failure screen may be available for later playback. After the failed computer (e.g., server) reboots, the post-failure screen may be accessed from the management processor memory using, for example, a viewer configured to access the management processor memory. For an iLO2, the viewer may be, for example, a remote console client software configured with a link to the stored post-failure screen. Thus, mission critical computer users will once again be able to view the cause of an automatic server reset.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable code, a thread of execution, a program, and a computer. By way of illustration, both an application running on a server and the server can be computer components. One or more computer components may reside within a process and/or thread of execution and a computer component can be localized on one computer and/or distributed between two or more computers.

"Computer-readable medium", as used herein, refers to a medium that stores signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, an operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other physical things that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus can be loaded and/or executed in serial, parallel, massively parallel and/or other manners.

Suitable software for implementing the various components of the example systems and methods described herein include programs written in programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
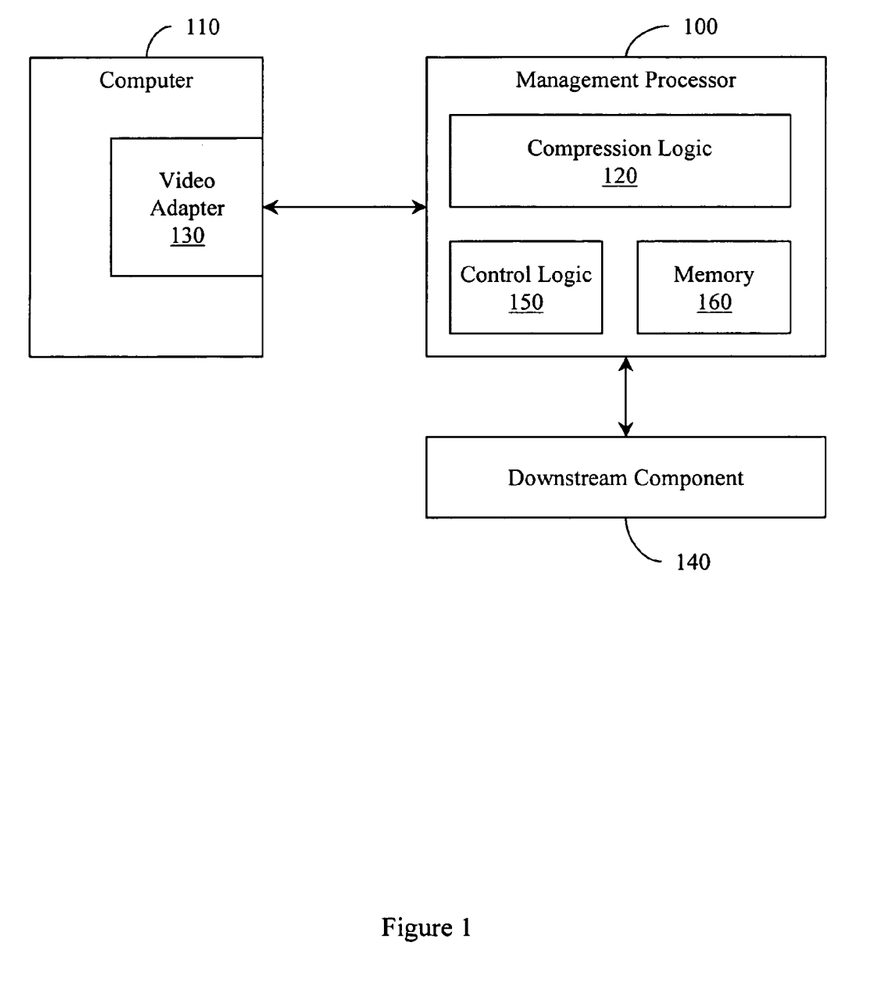
FIG. 1 illustrates an example system for acquiring a graphical operating system post-failure screen.

FIG. 1 illustrates a management processor 100 that is configured to facilitate obtaining a post-failure screen provided by a graphical operating system. Management processor 100 may be connected to a computer 110 that is configured to provide a graphical post-failure screen upon entering a failure state and then to self-reset. Computer 110 may be, for example, a server computer. A server may be, for example, a computer or device that manages resources like files, printers, network traffic, database queries, and so on. Servers may be dedicated, performing only their assigned server tasks, or may be more general purpose. A machine running a multi-processing operating system may execute several programs at once and thus function as several servers at once. While a single computer 110 is illustrated, it is to be appreciated that in some examples a management processor may be connected to more than a single computer and thus may obtain post-failure screens from more than a single computer. The post-failure screen may be provided in a graphical format to facilitate accommodating, for example, character sets (e.g., Kanji) that are presented in graphical rather than textual formats.

Management processor 100 may also be connected to a downstream component 140. Downstream component 140 may be, for example, a remote console system, a remote console application, a computer, a computer component, or the like. Thus, management processor 100 may receive a video stream from a video adapter 130 associated with computer 110 and in turn provide it to downstream component 140. Rather than simply forwarding the video stream, management processor 100 may compress the video stream before providing it to downstream component 140. The video stream may be, for example, digital graphics that are displayed on a monitor associated with computer 110. The graphics may be generated, for example, by a graphical operating system running on computer 110. The graphics may also be generated, for example, by applications running on computer 110. While a stream of video data is described, it is to be appreciated that in some examples the graphical output from computer 110 and/or applications and operating systems running thereupon may be provided in non-streaming forms.

Management processor 100 may be communicating received video data from computer 110 to a downstream component 140. Thus, management processor 100 may include a compression logic 120 that compresses the digital video stream into a compressed digital video data and then makes the compressed digital video data available to the downstream component 140.

Management processor 100 may also include a control logic 150 that is configured to identify whether computer 110 is in a failure state. For example, control logic 150 may identify that an operating system running on computer 110 has experienced an unrecoverable error. Similarly, control logic 150 may identify that an automatic server reset (ASR) signal has been asserted by computer 110. When computer 110 enters a failure state, it may produce a graphical (e.g., non text mode) post-failure screen. Thus, control logic 150 may be configured to control the management processor 100 to perform a screen refresh upon determining that computer 110 is in a failure state. The screen refresh will accomplish two things. First, it will make the post-failure screen available to downstream component 140. Second, it will make the post-failure screen available in a compressed and/or uncompressed format suitable for storing in the management processor 100. Storing the post-failure screen facilitates later analysis of what went wrong on the computer 110.

Since it may store the post-failure screen, the management processor 100 may also include a memory 160 that is operably connected to a compression logic 120 and to a control logic 150. Memory 160 may be configured to selectively store the post-failure screen generated by computer 110. Since the management processor 100 is receiving and compressing video provided from computer 110, the post-failure screen may be available in the compressed digital video data after the screen refresh and thus may be stored in a compressed format. Memory 160 may be, for example, a random access memory (RAM). In one example, memory 160 may also be, for example, a data store as that term is defined herein.

A self-reset (e.g., reboot) of computer 110 may cause the post-failure screen displayed by computer 110 to be erased. Thus memory 160 may be configured to selectively retain the post-failure screen independent of a self-reset of computer 110. To facilitate acquiring and retaining the post-failure screen, management processor 100 may be a separate logical entity from computer 110 and may be a separate physical entity as well. For example, management processor 100 may be implemented in forms including an application specific integrated circuit (ASIC), a field programmable gate array (FPGA), a plug-in circuit board, a stand alone computer component, and so on. Management processor 100 may be co-located in an enclosure with computer 110 and/or may stand alone from computer 110. In either configuration, management processor 100 may store data in memory 160 and have that data maintain its integrity after a reboot of computer 110.

In one example, computer 110 may be configured to automatically reboot a pre-defined period of time after entering the failure state. This pre-defined period of time may be controlled, at least in part, by a watchdog timer associated with computer 110. Thus, control logic 150 may be programmed to control the management processor 100 to perform the screen refresh after detecting that computer 110 is in a failure state but before the watchdog timer can expire. To meet this timing requirement, control logic 150 may determine that computer 110 is in a failure state by detecting an interrupt generated by computer 110. Additionally and/or alternatively, control logic 150 may determine that an automatic server reset (ASR) signal has been asserted in computer 110.

Computer 110 may produce a graphics mode post-failure screen. In one example, computer 110 may produce a non text mode post-failure screen that is a graphics mode screen consuming more than 100 Kb of memory in an uncompressed state. Since compression logic 120 compresses video (e.g., graphics mode screens) received from computer 110, a post-failure screen that would consume more than 100 Kb in an uncompressed state may be stored in memory 160 in a manner that consumes less memory.

Figure 2:
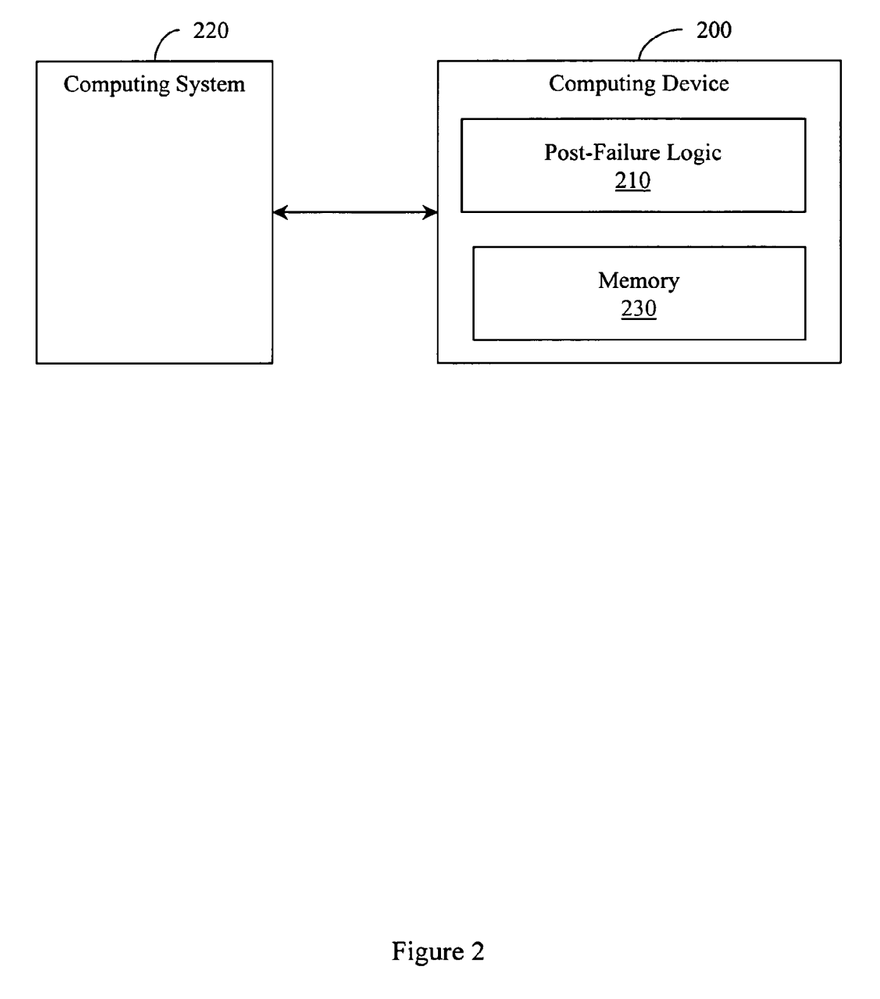
FIG. 2 illustrates another example system for acquiring a graphical operating system post-failure screen.

FIG. 2 illustrates another example system for acquiring a post-failure screen produced by a graphical mode operating system. Computing device 200 may include a post-failure logic 210 and a memory 230. Computing device 200 may be, for example, a computer, a system implemented on a plug-in circuit board, an ASIC, a FPGA, and so on. Computing device 200 may be connected to a computing system 220 running an operating system that produces the graphical post-failure screen. Computing device 200 may be, for example, a computer, a personal computer, a server, a set of computers, and so on.

Post-failure logic 210 may be configured to detect a failure in a related computer system like computing system 220 and to obtain a graphics mode post-failure screen from the related computer system. Being "related" in this context means being connected, directly and/or indirectly, so that signals associated with graphics produced by computing system 220 are available to computing device 200 and that computing device 200 is programmed to selectively process the available signals. Thus, computing system 220 and computing device 200 may be logically and/or physically distinct entities. Since they are independent, at least in part, computing device 200 may be configured to continue running during a reboot of computing system 220. Thus, information like a post-failure screen acquired during a failure of computing system 220 may be retained by computing device 200. This may facilitate post-failure analysis.

Since computing device 200 may store data like a post-failure screen received from computing system 220, computing device 200 may include memory 230 that is configured to store the graphics mode post-failure screen. Computing system 220 may automatically reboot after producing the graphics mode post-failure screen and thus computing system 220 may provide a signal to computing device 200 indicating that a reboot will occur within a pre-defined period of time. The signal may take forms like, for example, an interrupt, a voltage on a wire, a wireless signal, a value in a register, and so on.

Post-failure logic 210 may take different forms and thus may be implemented, for example, as an ASIC, an FPGA, and the like. While a single post-failure logic 210 is described, it is to be appreciated that in different examples, post-failure logic 210 may be configured to detect failures in a plurality of computer systems operably connected to computing device 200 and to selectively obtain and store graphics mode post-failure screens from each of the plurality of computer systems.

Example methods may be better appreciated with reference to flow diagrams. While for purposes of simplicity of explanation, the illustrated methodologies are shown and described as a series of blocks, it is to be appreciated that in some examples the methodologies may not be limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 3:
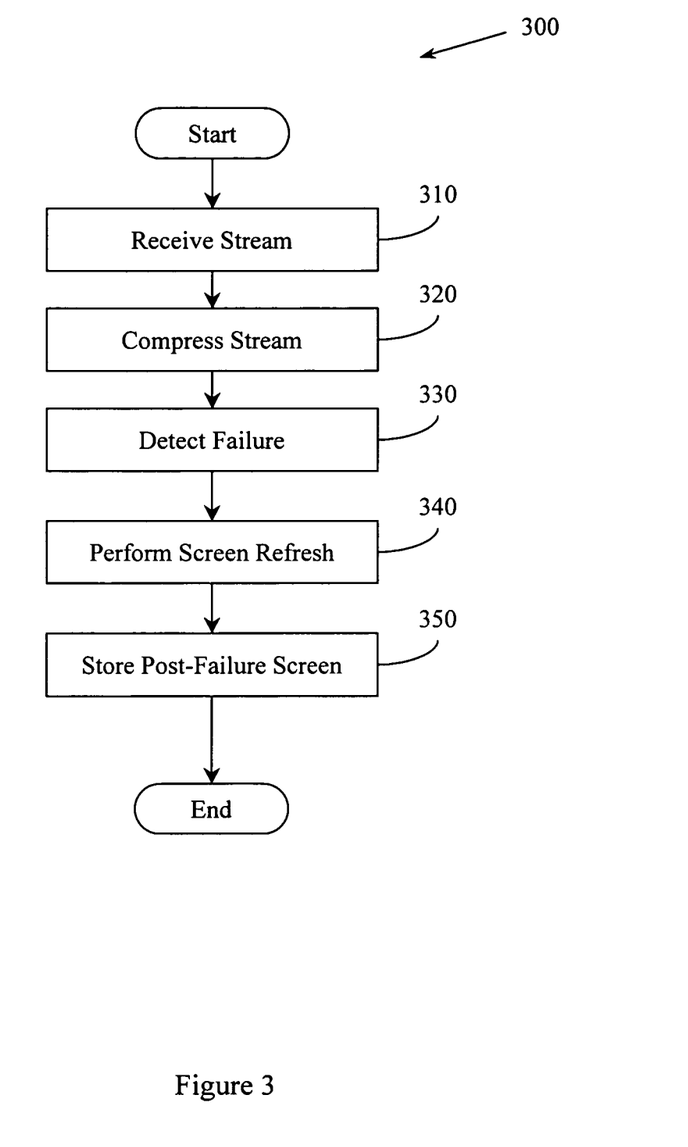
FIG. 3 illustrates an example methodology for acquiring a graphical operating system post-failure screen.

FIG. 3 illustrates an example methodology 300 associated with obtaining a graphical operating system post-failure screen. The elements illustrated in the flow chart denote "processing blocks" that may be implemented in logic. In one example, the processing blocks may represent executable instructions that cause a computer, processor, and/or logic to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits like an analog circuit, a digital signal processor circuit, an application specific integrated circuit (ASIC), or other logic. FIG. 3, as well as the other methodologies illustrated in flow diagrams, is not intended to limit the implementation of the described methodology examples. Rather, the diagrams illustrate functional information one skilled in the art could use to design/fabricate circuits, generate software, or use a combination of hardware and software to perform the illustrated processing.

Method 300 may be performed in a management processor (e.g., 100 FIG. 1), and/or a computing device (e.g., 200 FIG. 2) that is configured to be operably connected to a computer that is in turn configured to provide a graphical post-failure screen upon entering a failure state but before self-resetting. In one example, the computer may be a server that is configured with an operating system that does not have a text mode and therefore operates in a graphical mode. Since it operates in graphical mode, the operating system may produce a graphics mode post-failure screen rather than a text mode failure screen.

Method 300 may include, at 310, receiving a stream of video data from the computer. Receiving a stream may include, for example, substantially continuously receiving signals associated with displayed screens, signals associated with portions of displayed screens, individual pieces of data, sets of data, and so on. Thus, "receiving a stream" is intended to convey that signals and/or data used to display output can, in addition to being used to display that output, be provided to another component. For example, a video adapter in a computer may both use the signals and/or data to produce an output on a computer monitor and also forward the signals and/or data to another component like a management processor configured to perform method 300.

Method 300 may also include, at 320, compressing the received video data into a compressed video data. After compressing the data, method 300 may make the compressed video data available to a downstream component that is configured to display the compressed video data. The downstream component may be, for example, a remote console application. A remote console application may be, for example, an application that allows a first computer to display information displayed on a second computer and/or that allows the first computer to control, at least in part, the second computer.

Since method 300 facilitates obtaining a failure screen, method 300 may also include, at 330, detecting a failure state in the computer. Detecting the failure state may include, for example, receiving an interrupt associated with an automatic server reset (ASR) signal being asserted in the computer. While receiving an interrupt is described, it is to be appreciated that the failure state may be detected by other techniques that do not include receiving an interrupt. These techniques may include, for example, monitoring a voltage level on a line, examining the contents of a register, and so on.

Method 300 may also include, at 340, performing a screen refresh for the downstream component after detecting the failure state. The timing of the screen refresh may be controlled so that the screen refresh is performed at a time when a graphical post-failure screen will be available in the stream of video data. In one example, performing the screen refresh may include receiving an uncompressed video data associated with a post-failure screen display, compressing the uncompressed video data into a compressed data, and making the compressed data available to the downstream component.

Method 300 may also include, at 350, selectively storing a compressed version of the graphical post-failure screen in a memory associated with the management processor. This memory may be configured to retain the compressed version of the graphical post-failure screen after the computer resets.

While FIG. 3 illustrates various actions occurring in serial, it is to be appreciated that various actions illustrated in FIG. 3 could occur substantially in parallel. By way of illustration, a first process could receive and compress the video stream, a second process could detect failures, a third process could perform screen refreshes and obtain a post-failure screen while a fourth process could store the obtained post-failure screens. While four processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method performable in a management processor that is configured to be operably connected to a computer that is configured to provide a graphical post-failure screen after entering a failure state and before self-resetting. The method may include receiving a stream of video data from the computer, compressing it into a compressed video data, and making the compressed video data available to a downstream component. The method may also include detecting a failure state in the computer and then causing a screen refresh at a time when a graphical post-failure screen will be available in the stream of video data. The method may also include selectively storing the graphical post-failure screen in a memory associated with the management processor, the memory being configured to retain the graphical post-failure screen after the computer resets. While the above method is described being stored on a computer-readable medium, it is to be appreciated that other example methods described herein can also be stored on a computer-readable medium.

Figure 4:
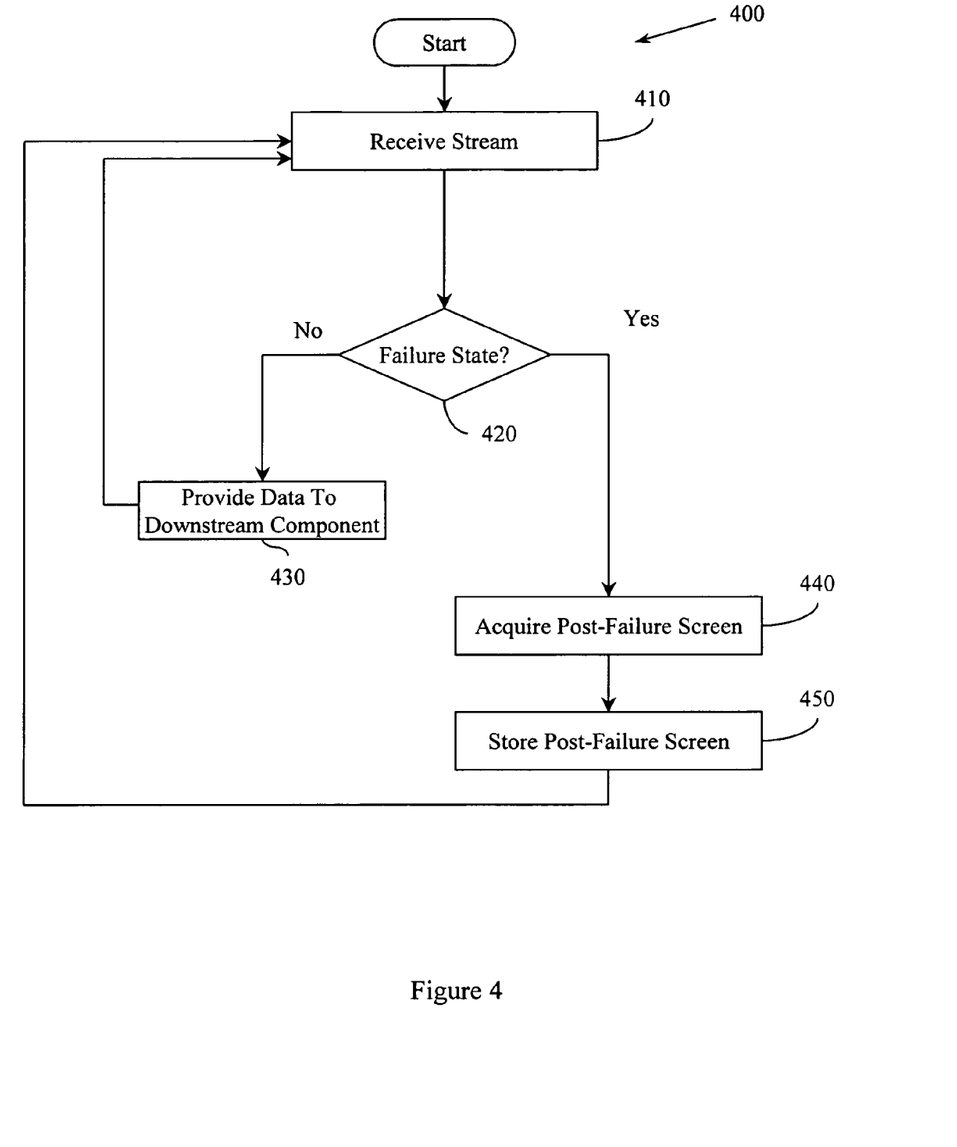
FIG. 4 illustrates another example methodology for acquiring a graphical operating system post-failure screen.

FIG. 4 illustrates another example method 400 for acquiring a post-failure screen produced by a graphical mode operating system running on a self-reset capable computer. Method 400 may include, at 410, receiving a stream of video data. Method 400 may also include, not illustrated, compressing that stream.

At 420, a determination may be made concerning whether a failure state exists in a computer providing the stream received at 410. If the determination at 420 is No, then processing may continue at 430 where the received data may be provided in a compressed and/or non-compressed format to a downstream component. In one example, if the downstream component is either not connected or is not accepting data, the received and/or compressed stream may simply be discarded.

If the determination at 420 is Yes, that the sender of the stream received at 410 is in a failure state, then processing may continue at 440. At 440, a post-failure screen may be acquired by, for example, locating and acquiring data and/or signals in the stream received at 410, the data and/or signals being associated with the post-failure screen. Having acquired the data and/or signals, the post-failure screen may be stored at 450. Method 400 may also include, before 440, performing a screen refresh (not illustrated). Since the sender of the stream may provide a graphics mode post-failure screen, performing the screen refresh may facilitate locating and/or obtaining data and/or signals associated with the post-failure screen.

Figure 5:
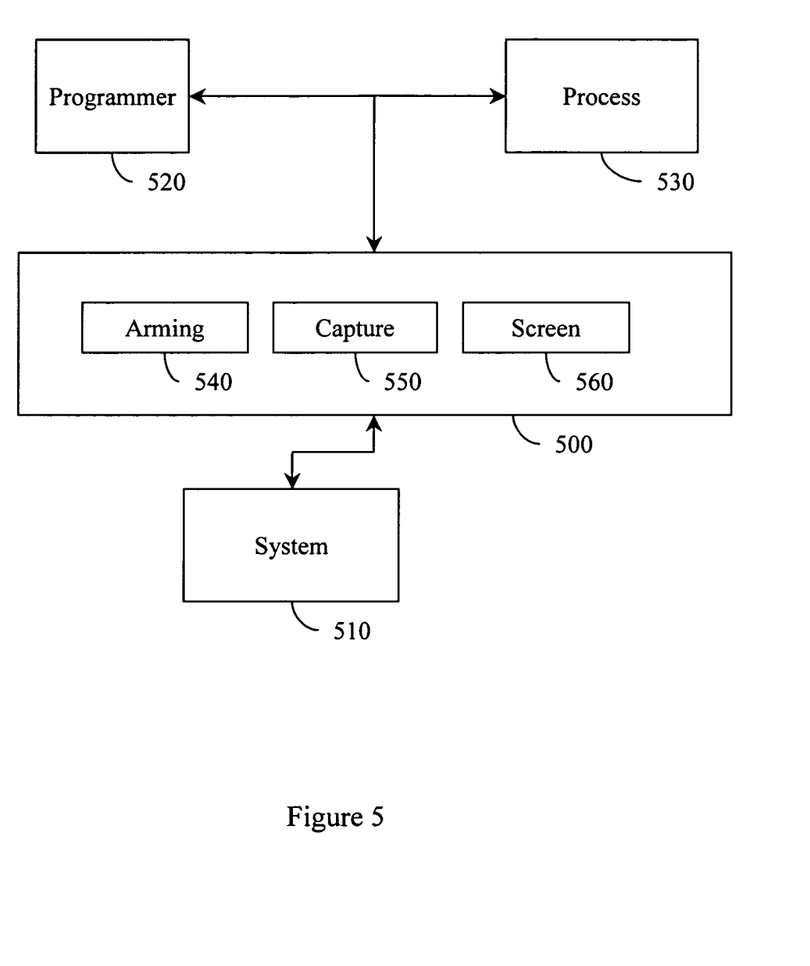
FIG. 5 illustrates an example application programming interface (API).

Referring now to FIG. 5, an application programming interface (API) 500 is illustrated providing access to a system 510 for acquiring a graphical operating system post-failure screen. API 500 can be employed, for example, by a programmer 520 and/or a process 530 to gain access to processing performed by system 510. For example, a programmer 520 can write a program to access system 510 (e.g., invoke its operation, monitor its operation, control its operation) where writing the program is facilitated by the presence of API 500. Rather than programmer 520 having to understand the internals of system 510, programmer 520 merely has to learn the interface to system 510. This facilitates encapsulating the functionality of system 510 while exposing that functionality.

Similarly, API 500 can be employed to provide data values to system 510 and/or retrieve data values from system 510. For example, a process 530 that displays stored post-failure screens can receive a post-failure screen from system 510 via API 500 by, for example, using a call provided in API 500. Thus, in one example of API 500, a set of application programming interfaces can be stored on a computer-readable medium. The interfaces can be employed by a programmer, computer component, logic, and so on to gain access to a system 510 for acquiring graphics mode post-failure screens produced by a reset-capable computer. The interfaces can include, but are not limited to, a first interface 540 that communicates an arming data. The arming data may facilitate controlling whether and/or when a post-failure screen is to be obtained. The arming data may, for example, identify a system for which a post-failure screen is to be obtained. The interfaces may also include a second interface 550 that communicates a capture event data. The capture event data may describe, for example, the types of events for which a post-failure screen is to be captured, whether a post-failure screen has been captured, for which device a post-failure screen has been captured, and so on. The interfaces may also include a third interface 560 that communicates a screen data associated with a captured post-failure screen. The screen data may be, for example, (un)compressed data that can be rendered into a graphical display.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a compression logic configured to receive a digital video stream from a video adapter associated with a computer with a display, to compress the digital video stream into a compressed digital video data, and to make the compressed digital video data available to a downstream component;
    a control logic configured to detect that the computer has entered a failure state due to an unrecoverable error that will cause the computer to automatically self-reboot a pre-defined period of time after entering the failure state and to detect a signal that identifies when the self-reboot will occur, the control logic configured to generate an interrupt prior to the self-reboot in response to entering the failure state, the pre-defined period of time being controlled, at least in part, by a watchdog timer associated with the computer;
    a management processor configured, in response to detecting the interrupt, to control the computer to perform a screen refresh of the display and to display a graphical post-failure screen upon determining that the computer is in the failure state and before the self-reboot has occurred, the graphical post-failure screen comprising a graphical representation that includes information about the failure state of the computer;
    a memory operably connected to the compression logic and the control logic, the memory being configured to store data corresponding to the graphical post-failure screen generated by the computer after entering the failure state and before the self-reboot has occurred, the graphical post-failure screen being available in the compressed digital video data, the memory being configured to retain the data corresponding to the graphical post-failure screen independent of the computer self-rebooting; and
    the computer being configured to provide an output based on the data corresponding to the graphical post-failure screen upon entering a failure state and then to self-reset.

2. The system of claim 1, the system being implemented in one of, an application specific integrated circuit (ASIC), a field programmable gate array (FPGA), a plug-in circuit board, and a stand-alone computing component.

3. The system of claim 1, the post-failure screen being a non text mode, graphics mode screen consuming more than 100 Kilobits of memory in an uncompressed state.

4. The system of claim 1, the interrupt being generated by the computer before the pre-defined period of time expires.

5. The system of claim 1, the downstream component being a remote console.

6. The system of claim 1:
    the post-failure screen being a non text mode, graphics mode screen consuming more than 100 Kb of memory in an uncompressed state,
    the system being implemented in an application specific integrated circuit (ASIC).

7. A method, comprising:
    receiving a stream of uncompressed video data from a computer;
    compressing the video data into a compressed video data and making the compressed video data available to a downstream component configured to display the compressed video data;
    detecting a failure state in the computer by receiving an interrupt from the computer that will cause the computer to self-reboot;
    detecting a signal that indicates the self-reboot;
    performing a screen refresh after detecting the failure state at a time when a graphical post-failure screen will be available in the stream of video data and before the computer performs the self-reboot, the graphical post-failure screen comprising information about the failure state of the computer;
    storing the graphical post-failure screen in a memory configured to retain the graphical post-failure screen after the computer self-reboots; and
    providing a link to access the graphical post-failure screen stored in the memory to a remote viewer, the remote viewer being configured to access the computer.

8. The method of claim 7, including
    producing a graphics mode post-failure screen that is larger than 512 Kilobits in an uncompressed format.

9. The method of claim 7, the method being implemented as a set of processor executable instructions, the processor executable instructions being stored on a non-transitory computer-readable medium.

10. A set of application programming interfaces embodied on a transitory computer readable medium for execution by a management processor in conjunction with acquiring a graphical post-failure screen provided by a graphical operating system running on a self-reset capable server, the graphical post-failure screen comprising information about the failure state of the computer, comprising:
    a first interface for arming the management processor to capture a post failure screen by:
        detecting an unrecoverable error that initiates an automatic self-reset, initiating a screen refresh a pre-defined period of time after entering the failure state, the pre-defined period of time being controlled, at least in part, by a watchdog timer associated with the computer;
        capturing the post-failure screen before the self-reset capable server performs the self-reset; and
        compressing a digital video stream containing the graphical post-failure screen into a compressed digital video data;
    a second interface for communicating that the post-failure screen has been captured; and
    a third interface for communicating the post-failure screen.

11. A computing device, comprising:
a post-failure logic configured to:
- detect a failure in a related computer system that causes a self-reboot to be performed automatically,
- detect a signal that indicates the self-reboot will be performed within a pre-defined period of time, the pre-defined period of time being controlled, at least in part, by a watchdog timer associated with the computer, and
- identify and obtain a graphics mode post-failure screen from the related computer system before the self-reboot is performed, the graphical mode post-failure screen comprising information about the failure state of the computer, the related computer system and the computing device being logically distinct entities, the computing device being able to continue running during the self-reboot of the computer system; and a memory configured to selectively store the graphics mode post-failure screen.

12. The computing device of claim 11, the post-failure logic being implemented as one of, an ASIC and an FPGA.

13. The computing device of claim 12, the post-failure logic being configured to detect failures in a plurality of computer systems operably connected to the computing device and to selectively obtain and store graphics mode post-failure screens from each of the plurality of computer systems.

* * * * *